(No Model.) 2 Sheets—Sheet 1.

N. J. TUBBS.
VEHICLE.

No. 594,768. Patented Nov. 30, 1897.

ATTEST.
J. Henry Kaiser.
C. J. Wayland.

INVENTOR.
Nelson J. Tubbs
by his atty (No Model.) 2 Sheets—Sheet 2.

N. J. TUBBS.
VEHICLE.

No. 594,768. Patented Nov. 30, 1897.

ATTEST:
J. Henry Kaiser.
C. G. Wayland.

INVENTOR.
Nelson J. Tubbs
by A. Crocker
his atty

UNITED STATES PATENT OFFICE.

NELSON J. TUBBS, OF KNOXVILLE, TENNESSEE.

VEHICLE.

SPECIFICATION forming part of Letters Patent No. 594,768, dated November 30, 1897.

Application filed December 14, 1896. Serial No. 615,580. (No model.)

*To all whom it may concern:*

Be it known that I, NELSON J. TUBBS, a citizen of the United States, residing at Knoxville, in the county of Knox and State of Tennessee, have invented certain new and useful Improvements in Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in vehicles, and has especial relation to improvements in the trucks and wheels thereof, the chief object of my device being to minimize the power necessary to propel vehicles, and especially road-wagons.

In my device the bed of the vehicle is carried by truck-frames mounted on four small wheels arranged in pairs. These small wheels are adapted to rotate upon the inside peripheries of the rims of four larger or draft wheels, these larger or draft wheels being provided with short axles mounted upon the front and rear truck-frames, the front truck-frame bearing upon the hounds and the fifth-wheel, which is attached to the axle of the smaller front wheels, the rear truck-frame being mounted upon the short axles of the large rear wheels and prevented from tilting by engagement with the coupling-pole and in part supported by hinged hounds projecting from the axle of the rear pair of the smaller or load wheels. The axles of the larger wheels are preferably located immediately above those of the smaller wheels, while the larger or draft wheels are dished outwardly or appropriately braced, and are provided with proper guideways to retain the smaller or load wheels in their proper position.

Figure 1:
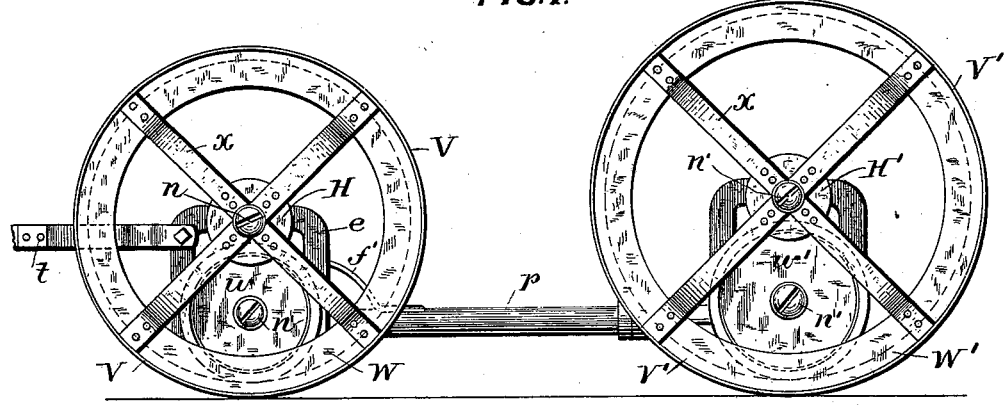
Figure 2:
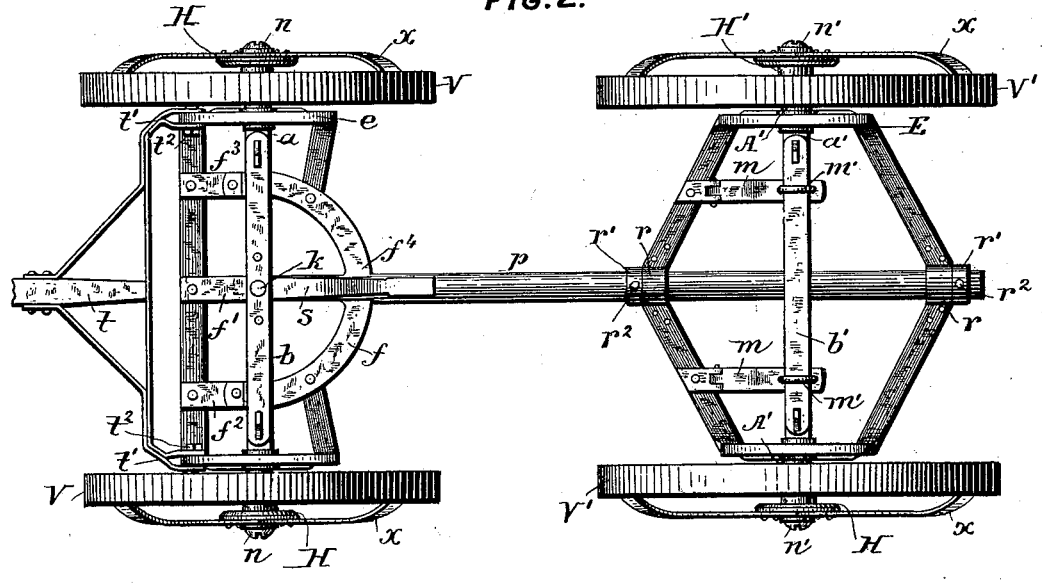
Figure 3:
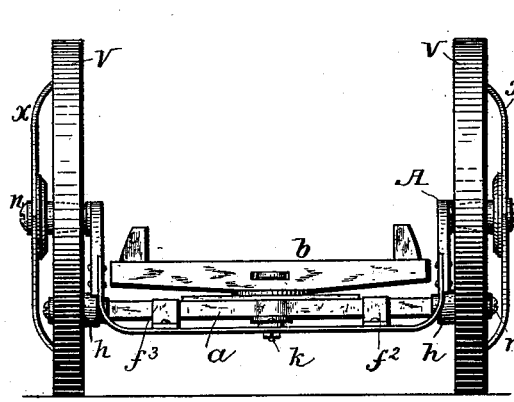
Figure 4:
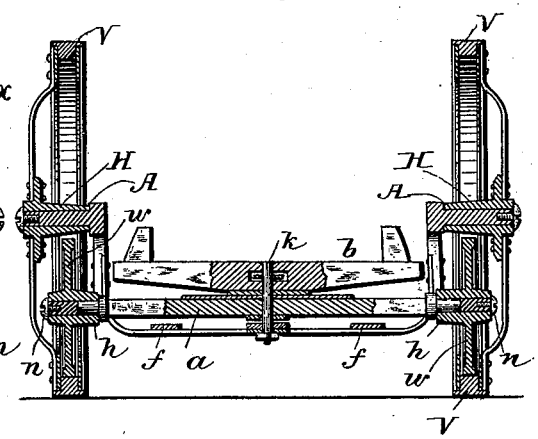
Figure 5:
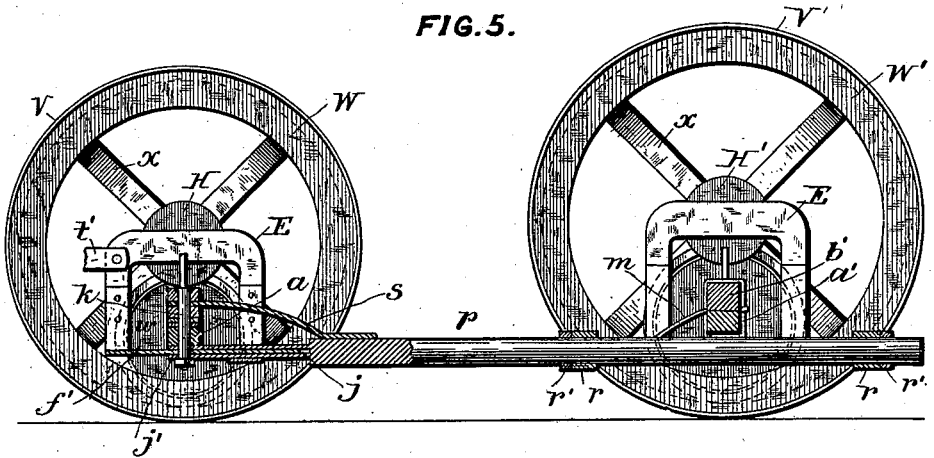

Of the accompanying drawings, Figure 1 is a side elevation of my improved wagon. Fig. 2 is a plan or top view thereof. Fig. 3 is an end view thereof. Fig. 4 is a vertical section of one side of the wheels and the gearing attached thereto with which my device is provided. Fig. 5 is a longitudinal section in part of my device.

In the drawings, in which similar reference-letters indicate corresponding parts, the wheels $w$ and $w'$ are the wheels upon which the bed of the wagon is directly mounted. These wheels are provided with the axles $a$ and $a'$, hubs $h$ and $h'$, and nuts $n$ and $n'$ of the ordinary form and construction. To the axle $a$ is attached, by means of the king-bolt $k$, the fifth-wheel $f$ and the front bolster $b$ in the usual manner, the king-bolt $k$ projecting through the hound $f'$, which braces the fifth-wheel $f$ longitudinally. The axle $a$ and the fifth-wheel $f$ are mounted to the forward truck-frame $e$ by means of the projecting ends $f^2$ and $f^3$ of the fifth-wheel $f$ and the hound $f'$. To the front of the forward truck-frame $e$ is attached the tongue or shaft $t$ by means of the knuckle-joints $t'$ and the bolts $t^2$. The coupling-pole $p$ is provided with the jaw $j$, through which is mounted the circular portion $f^4$ of the fifth-wheel $f$, and is attached to the forward truck-frame $e$ by means of the king-bolt $k$, which passes through the ends $j'$ of the jaw $j$ and through the front end of the stay $s$, the rear end of the stay $s$ being firmly secured to the front portion of the coupling-pole $p$ in any well-known manner. The coupling-pole $p$ is attached to the rear truck-frame E by means of the sleeves $r$, through which projects the rear portion of the coupling-pole $p$, the withdrawal of the coupling-pole $p$ from its engagement with the sleeves $r$ being prevented by the provision of the adjustable collars $r'$, which are provided with the set bolts $r^2$, by means of which it is apparent that while the truck-frame E is free to move around the coupling-pole $p$ it is prevented from moving backward or forward thereon by means of the said adjustable collars $r'$. It is apparent, also, that by properly adjusting the adjustable collars $r'$ the wagon may be coupled to any desired length. To the rear truck-frame E is mounted the axles A' of the large or draft wheels W', and it is braced to the axle $a'$ of the smaller or load wheels $w'$ and to the bolster $b'$ by means of the hinged hounds $m$, each of which is provided with the clevis $m'$, its engagement with the coupling-pole $p$ preventing its tilting, as above set forth. The smaller or load wheels $w$ and $w'$ are adapted to rotate on the inner peripheries of the rims V and V' of the large or draft wheels W and W', which are provided with the elliptical braces $x$, with the hubs H and H' and the nuts N and N', the rims being inwardly and concentrically extended, so as to retain the smaller or load wheels $w$ and $w'$ in their proper position.

Particular attention is invited to the fact that in my invention the power is applied, primarily, to the larger wheels W and W', and their rotation rotates the smaller or load wheel $w$ and $w'$, while in other inventions of a similar nature the power is applied directly to the smaller wheels, and their rotation rotates the larger or draft wheels.

The power required to draw my improved wagon is minimized by reason of the arrangement of the wheels $w$ and $w'$ and W and W', for it is obvious that the load-wheels $w$ and $w'$ exert a constant leverage on the wheels W and W', thereby contributing to reduce the power necessary to move them. The axle A of the wheels W being directly supported by the forward portion of the truck-frame $e$, which bears on the axle $a$ and the fifth-wheel $f$, which engages therewith, and the axle A' of the wheels W' being mounted on the rear truck-frame E it follows that the strain upon the wheels W and W' and the axles A and A' is practically borne by the axle $a$ and the rear truck-frame E, whereby it is apparent that the center of gravity is appreciably lowered, the utility of the wheels W and W' being chiefly to furnish an endless track of uniform resistance upon which the wheels $w$ and $w'$ can be moved at a far smaller expenditure of power than is necessary to draw an ordinary wagon loaded with a corresponding weight. The rear truck-frame E not being directly attached to the coupling-pole $p$, but being secured thereto by means of the adjustable collars $r'$, it is apparent that if either of the wheels W' be elevated more than its fellow the truck-frame E, being free to move about the coupling-pole $p$, will conform to such inequality in the road-bed, thereby obviating any wrench or strain that might occur were the truck-frame E rigidly connected with the coupling-pole $p$.

My improved wagon is peculiarly adapted to the heavy hauling in large cities or other places where the streets or roads are uniform, well paved, or in good condition, and it is believed that with a wagon constructed according to the foregoing specification two horses could readily draw such a load as would require four horses to draw if loaded on an ordinary wagon.

I am aware that vehicles have been constructed upon substantially the same principles as adopted in my device, and especially is this true of the patents granted to John T. Brooks on October 23, 1877, No. 196,331, for endless track-wheels; to William J. Johnson March 23, 1869, No. 188,178, for locomotive drive-wheels, and to Jacob Kirchhoffer February 11, 1878, No. 212,235, for improvement in wheels for traction-engines, and I do not claim anything shown or described therein; but, Having described my invention, what I do claim as new, and desire to secure by Letters Patent, is—

1. In a vehicle, the combination of four small wheels arranged in pairs on proper axles, and adapted to sustain the load borne by said vehicle; each of said small wheels being further adapted to rotate upon the inner periphery of larger wheels upon the rotation of said larger wheels, means for supporting the forward pair of large wheels, which consists of a frame attached to the axle of the front pair of small wheels, and provided with two vertically-extended yokes, in which the axles of the larger wheels are journaled, means for supporting the axles of the rear pair of large wheels, means for securing the small wheels in operative relation to the large wheels, and means for adjustably connecting the rear set of wheels with the forward set, substantially as and for the purpose specified.

2. In a vehicle, the combination of a forward truck carrying two small wheels, connected by an axle of the ordinary form and construction, and adapted to rotate upon the inner periphery of corresponding larger wheels attached to short axles mounted upon the truck-frame; means for securing said truck-frame to the axle of said smaller wheels, a fifth-wheel suitably attached to the axle of said smaller wheels and to the truck-frame, and loosely mounted within jaws in the forward end of a reach-pole, and hinged hounds for connecting the fifth-wheel with the truck-frame, a rear truck-frame consisting of two small wheels, connected by an axle of the ordinary form and construction, adapted to rotate upon the inner periphery of two larger wheels attached to short axles, a truck-frame consisting of two vertically-extended yokes, in which are journaled the short axles, two braces extending from the forward ends of the yokes and attached to a sleeve loosely mounted on the reach-pole, two similar braces extending from the rear ends of the yokes and also attached to a sleeve that is loosely mounted on the reach-pole, two collars mounted on the reach-pole and provided with set-screws, one collar arranged in advance of the rear truck-frame and the other in rear of the same whereby the rear truck-frame may be adjusted on the reach-pole and held in its adjusted position, means for securing said truck-frame to the axle of said smaller wheels, which consists of two hinged hounds that are attached to the front braces and to the said axle, substantially as and for the purpose specified.

3. In a vehicle, the combination of a front truck, consisting of two small wheels axled together in the usual manner, two larger wheels, upon the inner periphery of which said small wheels are adapted to rotate, a fifth-wheel secured to the axle of said small wheels, and a truck-frame mounted upon said fifth-wheel and upon hounds projecting from, and secured to, the axle of said small wheels, said large wheels being mounted upon short axles supported by said truck-frame, with a rear truck-frame consisting of two small wheels axled together in the usual manner, two larger wheels, upon the inner periphery of which the said small wheels are adapted to rotate, a truck-frame, supporting short axles upon which are mounted said last-mentioned larger wheels, which is secured to the axle of said last-mentioned small wheels, by means of hinged hounds projecting from said axle and to the coupling-pole, which couples said front and rear trucks together by means of sleeves through which said coupling-pole is projected, and adjustable collars on said coupling-pole adapted to engage against the sleeves on said truck-frame and to prevent same from moving forward and backward on said coupling-pole, suitable means for securing said coupling-pole to the front truck of the vehicle, and means for retaining said small wheels in operative position upon the inner periphery of the larger wheels, substantially as described.

In testimony whereof I affix my signature in presence of two witnesses.

NELSON J. TUBBS.

Witnesses:
W. W. SEXTON,
W. C. LAWSON.